UNITED STATES PATENT OFFICE.

WALTER SCHOELLER AND WALTHER SCHRAUTH, OF BERLIN, GERMANY, ASSIGNORS TO FARBENFABRIKEN VORM. FRIEDR. BAYER & CO., OF ELBERFELD, GERMANY, A CORPORATION OF GERMANY.

PRESERVING PREPARATION.

1,087,144.   Specification of Letters Patent.   Patented Feb. 17, 1914.

No Drawing.   Application filed June 21, 1910.   Serial No. 568,103.

*To all whom it may concern:*

Be it known that we, WALTER SCHOELLER and WALTHER SCHRAUTH, doctors of philosophy, chemists, citizens of the German Empire, residing at Berlin, Germany, have invented new and useful Improvements in Preserving Preparations, of which the following is a specification.

The invention described in our U. S. Letters Patents Nos. 967,841 and 967,842 of August 16, 1910 relates to the manufacture of preparations suitable as coatings, paints or varnishes which are remarkable for their good preserving properties. They are obtained by adding to suitable coatings, paints or varnishes salts or anhydrids of mercury substituted organic acids. We have now found that the same effect can be obtained by adding to suitable coatings, paints or varnishes instead of the above mentioned compounds, complex compounds which contain mercury joined to an aromatic nucleus and are capable of forming salts with heavy metals and of forming anhydrids, e. g. the anhydrids of oxymercuric phenols (hydrargyrum carbolicum), dinitrophenol, cresols, or sulfonic acids, etc., oxymercuric anilins, toluidins, etc., and the metal (Ca, Cu, Pb, Hg, etc.) salts of these mercury substituted phenols, cresols, sulfonic acids etc.

To the class of anhydrids of oxymercuric phenols, there belongs for example a substance having probably the formula:

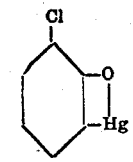

which is an anhydrid of oxy-mercuric-ortho-chlorphenol. This body is obtained by heating molecular proportions of sulfate of mercury and o-chlorphenol in aqueous solution. The thus obtained anhydrid of oxy-mercuric-ortho-chlorphenol separates in crystalline form and is completely insoluble in water. The crystals are then mixed to the extent of about 2% with any of the varnishes generally employed to ship's bottom and furnished coatings of remarkable preserving properties.

Instead of the anhydrids themselves we may employ as additions to the varnishes the salts of these anhydrids made with heavy metals, such as copper, lead, zinc, etc. These salts are obtained by first converting the anhydrids into the corresponding alkali salts for example:

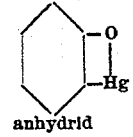   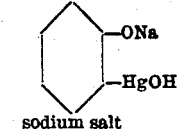
anhydrid      sodium salt and then treating the alkali salt with a solution of a heavy metal salt for example:

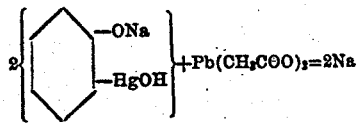 +Pb(CH₃COO)₂=2Na(CH₃COO)+ 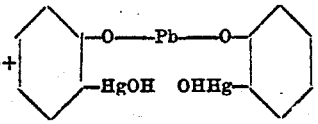

These salts are also completely insoluble in water and combine the poisonous effect of mercury with that of the corresponding heavy metal. Of these metal salts also about 2% are added to the ordinary varnish employed for painting ship's bottom.

Instead of the orthochlorphenol derivatives described above we may also employ the corresponding nitro derivatives:

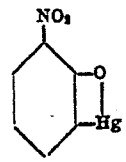

or the corresponding oxymercuric anilin derivatives:

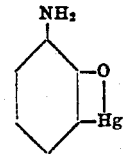

or the methyl derivatives:

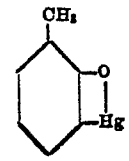

Or the acetyl-ortho-amino derivatives:

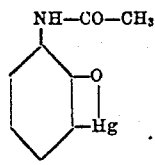

or derivatives thereof such as sulfonic acids. All these substances added to the amount of about 2% to varnishes generally employed for painting ships' bottoms furnish coatings of remarkable preserving properties.

The terms oxy-mercuric phenol derivatives is used as generic to the hereindescribed compounds whether in the form of their anhydrids or of their metal compounds.

We claim:—

1. The hereindescribed coating material comprising an oxy-mercuric phenol derivative, in conjunction with a suitable vehicle, substantially as described.

2. The hereindescribed coating material comprising a substituted oxy-mercuric phenol derivative, in conjunction with a suitable vehicle, substantially as described.

3. The hereindescribed coating material comprising a nitro-oxy-mercuric phenol derivative, in conjunction with a suitable vehicle, substantially as described.

4. The hereindescribed coating material comprising an anhydrid of an oxy-mercuric phenol, in conjunction with a suitable vehicle, substantially as described.

5. The hereindescribed coating material comprising an anhydrid of a substituted oxy-mercuric phenol, in conjunction with a suitable vehicle, substantially as described.

6. The hereindescribed coating material comprising the anhydrid of a mercury substituted dinitrophenol, in conjunction with a suitable vehicle, substantially as described.

In testimony whereof we have hereunto set our hands in the presence of two subscribing witnesses.

DR. PHIL. WALTER SCHOELLER.
DR. WALTHER SCHRAUTH.

Witnesses:
HENRY HASPER,
WOLDEMAR HAUPT.